Patented Feb. 21, 1933

1,898,909

UNITED STATES PATENT OFFICE

GEORGE T. SOUTHGATE, OF FOREST HILLS, NEW YORK, ASSIGNOR TO UNION CARBIDE & CARBON RESEARCH LABORATORIES, INC., A CORPORATION OF NEW YORK

WELDING ELECTRODE

No Drawing.    Application filed February 10, 1931. Serial No. 514,912.

My invention relates to welding rods or electrodes especially adapted for electric welding. My invention has for its objects the production of a welding rod or electrode having a coating which shall be conductive, thereby permitting its use in automatic welding machines, and which shall give a stable arc, a slag formation which shall protect the deposited metal, and in which provision is made for the denitrification of the deposited metal. The improved results of my invention are secured by coating a rod of suitable ferrous material with mixtures of an alkaline earth or compound thereof, such as calcium oxides and with nitrogen-combining ferro-alloy-forming metals. In order to secure the proper slag formation, it is generally desirable to include a fluxing material such as silica. I have found suitable ferro-alloy-forming metals to be chromium, molybdenum, tungsten, titanium and cerium. These metals are powdered and mixed with calcium oxide or other alkaline earth compounds and generally with silica and a binder. The coating is then applied to the rod by painting, dipping or spraying and the rods dried or baked. Another method consists in melting the ferro-alloy-forming metal with calcium and silicon and dipping the rod in the molten alloy.

When making the rod coating of the powdered materials I prefer to use one part of calcium oxide with one part of silicon dioxide and one of the following metals in approximately the amount stated: chromium 1 part; molybdenum 2 parts; tungsten 3.5 parts; titanium 1 part; cerium 2.5 parts. The exact proportion of silica may be varied according to the conditions of slag formation desired. The coating should also preferably contain carbon. This carbon may be in the form of a char produced by the carbonization of an organic binder or may be free carbon added to the coating mixture. In the latter case I prefer to use colloidal graphite since upon drying this forms an intimate adherent mixture.

It will be evident from the above that I have devised a welding rod or electrode which will give a stable arc and which will minimize nitrification of the deposited weld metal.

I claim:

1. A welding rod consisting of a ferrous base having thereon a coating comprising an alkaline earth 1 part and a nitrogen-combining ferro-alloy-forming metal in metallic form substantially from 1 to 3½ parts.

2. A welding rod consisting of a ferrous base having thereon a coating comprising an oxide of an alkaline earth metal 1 part, a nitrogen-combining ferro-alloy-forming metal in metallic form substantially from 1 to 3½ parts, silica and carbon.

3. A welding rod consisting of a ferrous base having thereon a coating comprising lime and chromium in metallic form, in approximately equal parts.

4. A welding rod consisting of a ferrous base having thereon a coating comprising lime 1 part and tungsten in metallic form substantially 3.5 parts.

5. A welding rod consisting of a ferrous base having thereon a coating comprising lime 1 part and titanium in metallic form substantially 1 part.

6. A welding rod consisting of a ferrous base having thereon a coating consisting of chromium in metallic form, an oxide of an alkaline earth metal, silica and carbon in an intimate adherent form, the chromium and alkaline earth metal oxide being in approximately equal parts.

7. A welding rod consisting of a ferrous base having thereon a coating consisting of tungsten in metallic form, an oxide of an alkaline earth metal, silica and carbon in an intimate adherent form, the tungsten being present in an amount substantially 3.5 times by weight of the alkaline earth metal oxide.

8. A welding rod consisting of a ferrous base having thereon a coating consisting of titanium in metallic form, an oxide of an alkaline earth metal, silica and carbon in an intimate adherent form, the titanium and alkaline earth metal oxide being in approximately equal parts by weight.

In testimony whereof, I affix my signature.

GEORGE T. SOUTHGATE.